United States Patent [19]

Goetzinger

[11] Patent Number: 4,936,690
[45] Date of Patent: Jun. 26, 1990

[54] THERMOCOUPLE TRANSMITTER WITH COLD JUNCTION COMPENSATION

[75] Inventor: Charles E. Goetzinger, Bloomington, Minn.

[73] Assignee: Rosemount Inc., Eden Prairie, Minn.

[21] Appl. No.: 359,332

[22] Filed: May 31, 1989

[51] Int. Cl.$^5$ ............................................ G01K 07/12
[52] U.S. Cl. ..................................... 374/181; 374/133
[58] Field of Search ............... 374/181, 182, 168, 112, 374/133

[56] References Cited

U.S. PATENT DOCUMENTS

| | | | |
|---|---|---|---|
| 3,680,384 | 8/1972 | Grindheim | 374/112 |
| 4,130,019 | 12/1978 | Nitschke | 374/181 X |
| 4,157,663 | 6/1979 | Ihlenfeldt | 374/181 |
| 4,488,824 | 12/1984 | Salem | 374/181 |
| 4,623,266 | 11/1986 | Kielb | 374/181 |

*Primary Examiner*—Daniel M. Yasich
*Attorney, Agent, or Firm*—Kinney & Lange

[57] ABSTRACT

A transmitter generates an output signal, which represents temperature, based on potential across thermocouple leads from a main thermocouple. A housing has first and second terminals extending through a wall which separates first and second cavities in the housing. The terminals are connected to the thermocouple leads in the first cavity to form terminal cold junctions. A converter has converter leads which are connected to the terminals in the second cavity. The converter senses a combined signal which represents main thermocouple potential and terminal cold junction potential. The converter also provides the output signal. A conductor has a first end coupled to the first terminal and a second end coupled to the converter forming a correction thermocouple. The correction thermocouple provides a first correction signal representing a difference between a terminal temperature and a converter temperature. A sensor on the converter provides a converter temperature signal which represents the converter temperature. The converter provides the output signal as a function of the converter temperature signal, the first correction signal, and the combined signal.

7 Claims, 2 Drawing Sheets

THERMOCOUPLE TRANSMITTER WITH COLD JUNCTION COMPENSATION

BACKGROUND OF THE INVENTION

1. Field of the Invention

The present invention relates to generating an output signal representing temperature. More particularly, the present invention relates to cold junction compensation for a transmitter which generates an output signal based on an input signal from a thermocouple.

2. Description of the Prior Art

In prior art transmitters, cold junction compensation has been achieved by thermally coupling a temperature sensing resistor to cold junction terminals. There is thermal resistance between the terminals and the sensing resistor. When rapid temperature changes occur around the terminals, transient temperature differences between the terminal and the sensing resistor cause transient errors in the cold junction compensation. Various techniques are known to reduce this error, such as providing a thermal mass around the cold junction terminals and the sensing resistor, or adding mass to the sensing resistor to match its thermal transient response to that of the cold junction as taught in U.S. Pat. No. 4,623,266 to Kielb.

However, improving transient temperature response by adding mass has the undesired effect of increasing size, weight and cost of the transmitter. As advances are made in reducing size and increasing accuracy in thermocouple converter circuits, these prior art arrangements impose significant limits on transmitter size and temperature conversion accuracy.

Therefore, there is a need to increase accuracy and reduce size of thermocouple terminals so that fuller advantage can be taken of improved converter accuracy. Also, if the size of the thermocouple terminals is reduced, corresponding reductions in the size of surrounding transmitter housings can be affected.

SUMMARY OF THE INVENTION

In the present invention, a cold junction compensation arrangement is provided which avoids the need for a cold junction resistor at the thermocouple terminals.

A transmitter generates an output signal representing temperature based on a potential across thermocouple leads from a main thermocouple. The transmitter includes a housing having terminals extending through a wall which separates first and second cavities in the housing. The terminals are connected to the thermocouple leads in the first cavity to form terminal cold junctions. A converter has converter leads connected to the terminals in the second cavity. A separate conductor has a first end connected to the first terminal and a second end connected to the converter and is made of a selected material to form a correction thermocouple. The correction thermocouple provides a first correction signal representing a difference between a terminal temperature and a converter temperature. The converter senses a combined signal representing main thermocouple potential and terminal cold junction potential. Sensing means provides a converter temperature signal which represents the converter temperature. The converter provides the output signal as a function of the converter temperature signal, the first correction signal and the combined signal.

DETAILED DESCRIPTION OF THE PREFERRED EMBODIMENTS

Figure 1:
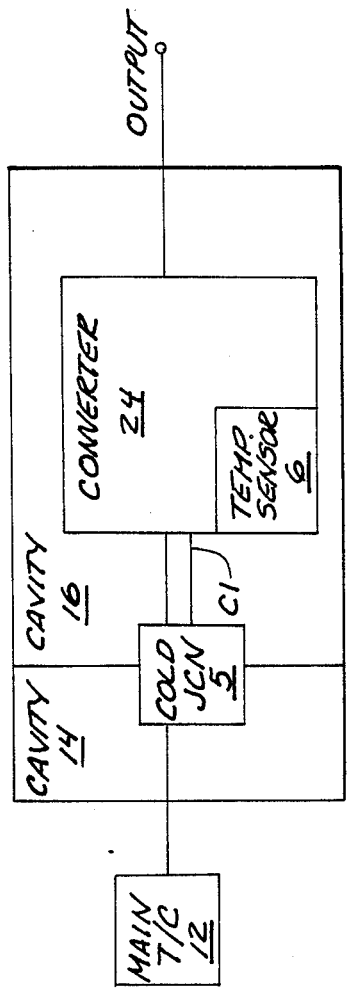
FIG. 1 is a block diagram of the main thermocouple and transmitter of the present invention.

FIG. 1 is a block diagram showing transmitter 10 and main thermocouple 12 of the present invention. Transmitter 10 comprises cold junction 5, converter temperature sensor 6, conductor C1 and converter 24. Transmitter 10 is also divided into first cavity 14 and second cavity 16.

Main thermocouple 12 provides a potential-dependent temperature signal to cold junction 5 representing the temperature difference between main thermocouple 12 and cold junction 5. This temperature signal is then provided to converter 24.

Conductor C1 is connected to cold junction 5 and forms junctions which comprise a correction thermocouple which provides converter 24 with a temperature correction signal representing the temperature difference between cold junction 5 and converter 24. Also, converter temperature sensor 6 is located on converter 24 and provides converter 24 with a temperature signal representing the temperature of converter 24.

Based on the temperature signals provided by main thermocouple 12, converter temperature sensor 6 and the correction thermocouple created by conductor C1, converter 24 generates a cold junction compensated output signal representative of the temperature at main thermocouple 12.

Figure 2:
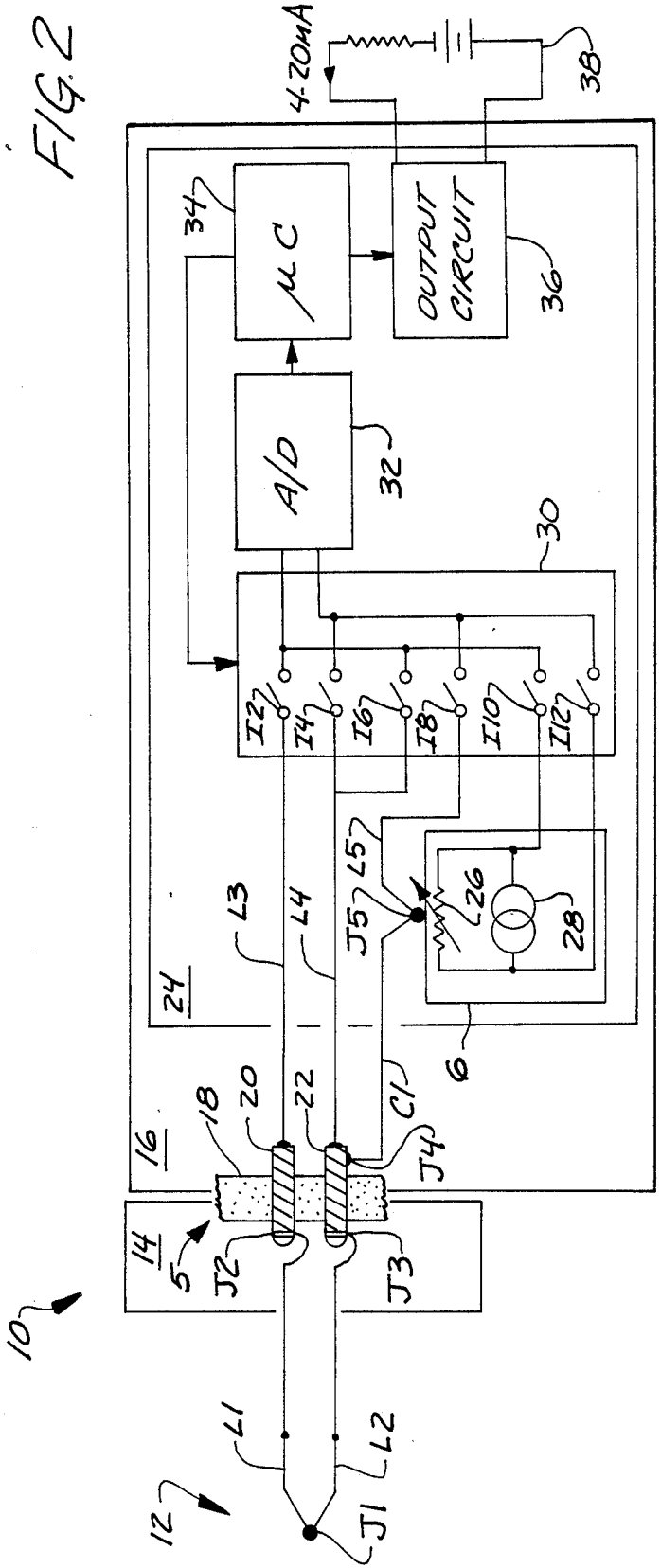
FIG. 2 is a simplified schematic representation of a typical transmitter and main thermocouple of the present invention.

FIG. 2 is a simplified schematic representation of transmitter 10 and main thermocouple 12. Main thermocouple 12 comprises thermocouple leads L1 and L2 which are connected to form main thermocouple junction J1. Transmitter 10 comprises first cavity 14 and second cavity 16. Cavities 14 and 16 are separated by cavity wall 18.

Leads L1 and L2 of main thermocouple 12 are coupled to cold junction terminals 20 and 22 in cavity 14. Thermocouple leads L1 and L2 are typically formed of metals which are different from those comprising terminals 20 and 22. Therefore, cold junctions J2 and J3 are formed at the point where leads L1 and L2 are connected to terminals 20 and 22.

Terminals 20 and 22 extend through cavity wall 18 into cavity 16. Cavity 16 contains converter 24 which, in this preferred embodiment, comprises junction J5 and temperature sensor 6 which includes resistive sensor 26 and current source 28. The converter also comprises multiplexer 30, analog-to-digital (A/D) converter 32, microprocessor-based controller 34 and output circuit 36.

Converter leads L3 and L4 are connected to terminals 20 and 22, respectively. Also, converter leads L3 and L4 are coupled to multiplexer inputs I2, I4 and I6. In this arrangement, junctions J1, J2 and J3 are connected in electrical series to converter 24. Therefore, the signal appearing across multiplexer inputs I2 and I4 represents the combined potential resulting from junctions J1, J2 and J3.

To provide for cold junction compensation, conductor C1 is connected between terminal 22 and converter lead L5 and is formed of a metal which is different from that of both terminal 22 and converter lead L5. Therefore, a correction thermocouple is formed having junctions J4 and J5. For this reason, terminal 22 is not only part of a cold junction in the thermocouple circuit comprising junctions J1, J2 and J3, but it is also part of the correction thermocouple circuit comprising thermocouple junctions J4 and J5.

The temperature at junction J4 is closely matched to the temperature of cold junctions J2 and J3. Therefore, the correction thermocouple effectively senses the difference between the temperature of converter 24 and the cold junction temperature. This difference is provided to multiplexer 30 as a correction potential across multiplexer inputs I6 and I8.

Resistive sensor 26 is located in cavity 16 where it is buffered or isolated from thermal transients in cavity 14. Resistive sensor 26, in combination with current source 28, provides a converter temperature signal, appearing as a potential across multiplexer inputs I10 and I12, to converter 24. The converter temperature signal represents the temperature of converter 24. It should be noted that any means of determining the temperature of converter 24 could be used instead of resistive sensor 26 as long as it is reasonably accurate.

Cold junction compensation is effected by combining the converter temperature signal appearing across multiplexer inputs I10 and I12 with the correction signal from the correction thermocouple input appearing across multiplexer inputs I6 and I8. Based on this combination of inputs, microprocessor-based controller 34 calculates a correction constant which is substantially equivalent to a calculated cold junction potential. The correction constant is used by microprocessor-based controller 34 to compensate the combined temperature signal, appearing across multiplexer inputs I2 and I4, for the cold junction temperature.

The value of the compensated signal (in this embodiment a potential) is then typically entered into a look-up table or a polynomial by microprocessor-based controller 34 to calculate an output representative of the temperature at junction J1 of main thermocouple 12.

In general, microprocessor-based controller 34 controls multiplexer 30 so that a selected pair of multiplexer inputs are connected to A/D converter 32. A/D converter 32 converts the thermocouple and temperature sensor signals to digital signals and provides them to microprocessor-based controller 34. Based on these inputs (as discussed above), microprocessor-based controller 34 provides control signals to output circuit 36 which, in turn, generates an output signal representative of the temperature at junction J1 of main thermocouple 12. In the embodiment shown in FIG. 2, the output signal is in the form of a 4-20 milliamp signal generated in current loop 38.

The embodiment shown in FIG. 2 is effective when junctions J2 and J3 are closely matched in temperature. In some cases, terminals 20 and 22 can have different temperatures. In that case, a second correction thermocouple circuit, as shown in FIG. 3, is added to terminal 20 to provide more accurate compensation.

Figure 3:
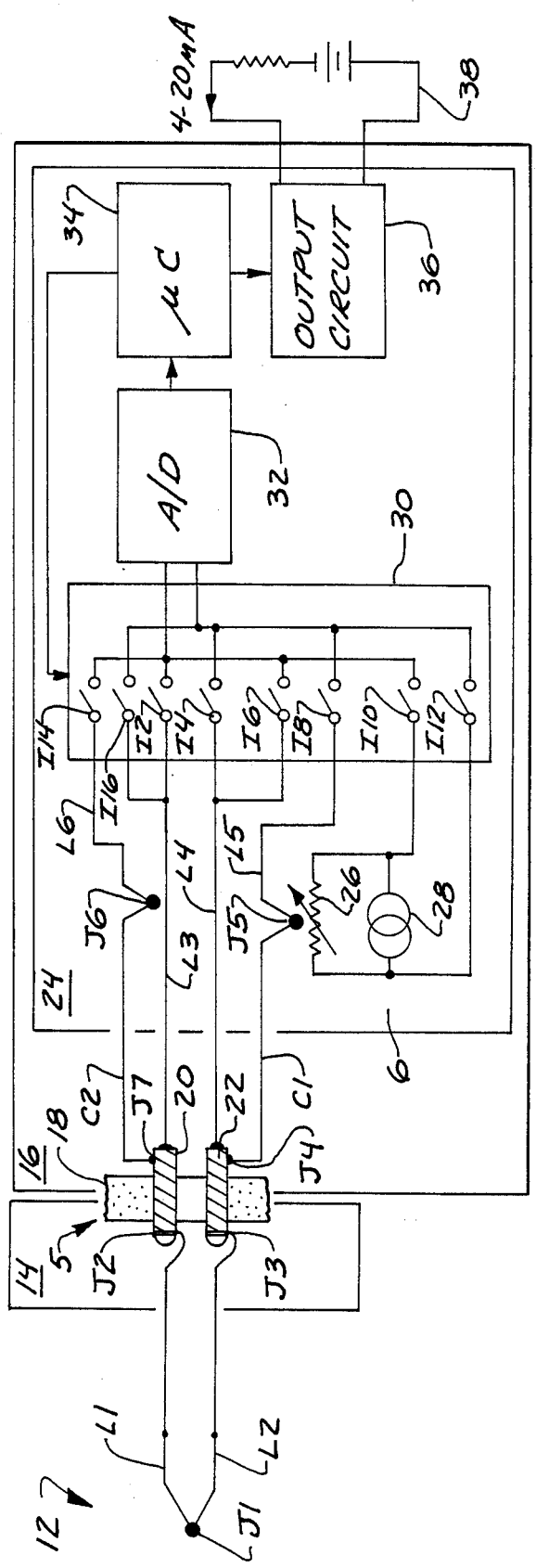
FIG. 3 is also a simplified schematic representation of a typical transmitter and main thermocouple of the present invention.

FIG. 3 shows a simplified schematic representation of transmitter 10 and main thermocouple 12. This is identical to the embodiment shown in FIG. 2 except that conductor C2, converter lead L6, and multiplexer inputs I14 and I16 have been added. As with the first correction thermocouple described above, conductor C2 is of a different material than terminal 20 and lead L6. This effectively creates a second correction thermocouple which has junctions J6 and J7 and which provides converter 24 with a second correction signal representing the temperature difference between converter 24 and terminal 20.

Microprocessor-based controller 34 now controls multiplexer 30 to multiplex the second correction signal, appearing across multiplexer inputs I14 and I16, into A/D converter 32 as well as the signals appearing across the other mulitplexer inputs. The second correction signal is also used to compensate the combined temperature signal, appearing across inputs I2 and I4 of multiplexor 30, for cold junction temperatures.

Transmitter 10 is capable of operating with thermocouple 12 either being remote from transmitter 10 or being manufactured as an integral part of transmitter 10.

This arrangement is substantially free of the effects of temperature lag experienced with methods of cold junction compensation which have resistors located on the terminal block.

Also, by using a combined correction equation, the number of calculations required by microprocessor-based controller 34 is reduced. This increases the speed with which transmitter 10 can respond to temperature changes.

Although the present invention has been described with reference to preferred embodiments, workers skilled in the art will recognize that changes may be made in form and detail without departing from the spirit and scope of the invention.

What is claimed is:

1. A transmitter for generating an output signal representing temperature based on potential across thermocouple leads from a main thermocouple, comprising:
    a housing having first and second terminals extending through a wall separating first and second cavities in the housing, the terminals being connected to the thermocouple leads in the first cavity to form terminal cold junctions;
    converter means, having converter leads connected to the terminals in the second cavity, for sensing a combined signal representing main thermocouple potential and terminal cold junction potential and for providing the output signal;
    conductor means, having a first end coupled to the first terminal and a second end coupled to the converter means, for forming a correction thermocouple, the correction thermocouple providing a first correction signal representing a difference between a terminal temperature and a converter means temperature; and
    sensing means on the converter means for providing a converter temperature signal representing the converter means temperature, the converter means providing the output signal as a function of the converter temperature signal, the first correction signal and the combined signal.

2. The transmitter of claim 1 wherein the sensing means further comprises
    a resistive temperature sensor.

3. The transmitter of claim 1 and further comprising:
    second conductor means, having a first end coupled to the second terminal and a second end coupled to the converter means, for forming a second correction thermocouple, the second correction thermocouple providing a second correction signal indicating a difference between a second terminal temperature and the converter means temperature.

4. The transmitter of claim 3 wherein the converter means provides the output signal as a function of the converter temperature signal, the first correction signal, the combined signal, and the second correction signal.

5. The transmitter of claim 1 wherein the main thermocouple is remote from the transmitter.

6. The transmitter of claim 1 wherein the main thermocouple is integrally coupled to the transmitter.

7. The transmitter of claim 1 wherein the converter means further comprises:
- an analog-to-digital (A/D) converter coupled to the correction thermocouple, the sensing means and the converter leads;
- a microprocessor-based controller coupled to the A/D converter; and
- an output circuit coupled to the microprocessor-based controller.

* * * * *